May 19, 1942.  R. U. CLARK  2,283,723
POROUS ELECTRODE ELECTROLYTIC CONDENSER
Filed June 13, 1939
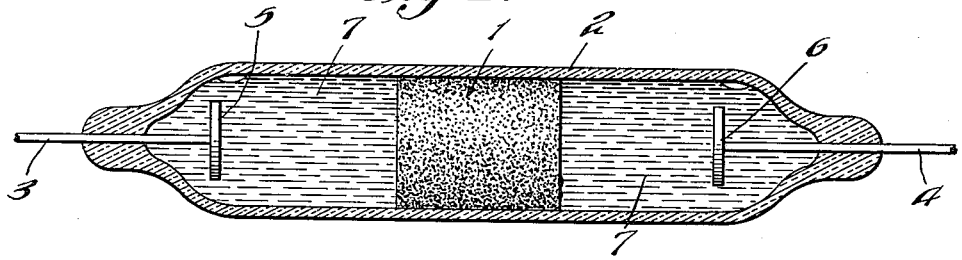
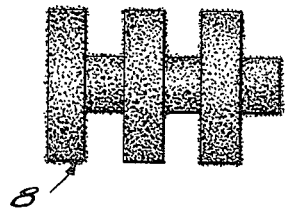
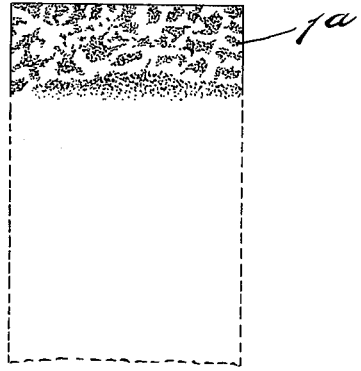
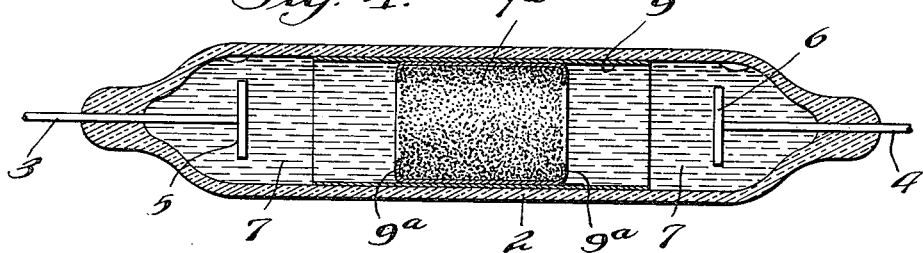
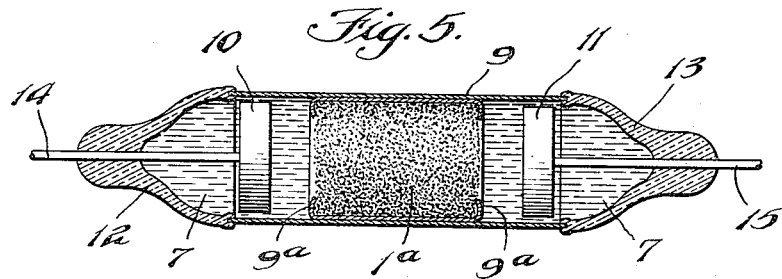
INVENTOR.
Richard U. Clark
BY Parkinson & Lane
ATTORNEYS.

Patented May 19, 1942

2,283,723

UNITED STATES PATENT OFFICE 2,283,723

POROUS ELECTRODE ELECTROLYTIC CONDENSER

Richard U. Clark, Fort Wayne, Ind., assignor to The Magnavox Company, Incorporated, Fort Wayne, Ind., a corporation of Indiana Application June 13, 1939, Serial No. 278,825

5 Claims. (Cl. 175—315)

The present invention relates to improvements in electrolytic condensers, and more particularly to the type of condenser in which a high surface factor filmed electrode is used. It has for one of its objects the provision of a novel form of high surface factor electrode of very effective composition and construction and capable of low cost manufacture.

Another object of the present invention is to provide an improved form of compressed powdered condenser electrode which does not require sintering to bond the particles together.

A further object of the present invention is the provision of condenser electrodes of high surface factor types in which, in addition to the high gain in capacity which always results, there will be a considerable reduction in the inherent rise in series resistance and the power factor of the condenser which results from the employment of high surface factor electrodes.

Still another object is to provide a form of condenser assembly that will be very compact and cheap to manufacture and, where liquid electrolytes are used, one that may be effectively sealed at the electrode lead-ins to prevent any electrolyte leakage at such points.

Another object of the present invention is to provide a series or back-to-back type of condenser in a novel and economical form.

Further objects, advantages and capabilities will later more fully appear or are comprehended in the device.

In the drawing:

Fig. 1 is a view in vertical cross-section through a porous anode type of electrolytic condenser in which no lead is applied to the anode as it is intended to be used as a back-to-back condenser.

Fig. 2 is a view in side elevation of a novel low power factor form of electrode.

Fig. 3 is an enlarged fragmentary view of an electrode section showing the high porosity of the condenser electrode at any given point in its structure.

Fig. 4 is a view similar to Fig. 1 of another form of film carrying electrode of the porous type in which a valve metal powder or powders are pressed into a tubular retaining form of valve metal and clinched in to retain pressure upon the porous mass. In this form of the invention, the novel electrode is shown in an electrolytic condenser operable as a back-to-back unit.

Fig. 5 is a view similar to Fig. 4, in which contact is made to the porous filmed electrode through its enlarged shell.

Referring more particularly to Fig. 1 of the drawing, the member 1 is a porous slug of pressed powders of valve metals. This slug carries a dielectric film preformed to the desired voltage, and is enclosed in an insulating tube or envelope 2 of glass, ceramic, Celluloid, rubber or any other material suitable for the purpose. The chief desire here is to obtain a container material which will withstand all electrolytes and which will readily seal the lead-ins 3 and 4 for electrodes 5 and 6, respectively. Since these electrodes will preferably be of relatively non-filming materials, a fairly wide range and choice of metals and alloys that will seal readily to glass may be had. In the condenser of Fig. 1, the electrolyte 7 is added and the unit is permanently sealed, although a vent may be provided if desired or necessary.

In the operation of the condenser of Fig. 1, if a negative potential is applied to the electrode 5 and a positive potential to electrode 6, the voltage gradient between the filmed slug electrode 1 and the electrode 5 will rise to substantially the total applied voltage, whereas the gradient across the slug electrode 1 and electrode 6 becomes approximately zero potential. This is due to the positive flow through the electrolyte to the dielectric film on the electrode slug 1. The action of charging the condenser will be the same if the polarity of the input is reversed except that the gradients between the respective input electrodes and the slug electrode will also be reversed. This condenser will, therefore, work readily on raw A. C. without polarization being required.

The advantage obtained by omitting the anode lead in Fig. 1 is the low resultant sealing-in cost and also the great simplicity in the sealing-in problem, especially in glass into which most of the filming metals, except tantalum and tungsten, do not seal readily.

In Fig. 2 is shown a form of electrode 8 which may be used either as an anode or as a cathode. This form permits the use of thin wall sections without greatly decreasing the total effective surface area for a given volume of electrode.

Fig. 3 shows an enlarged or microscopic view in side elevation of a porous electrode slug to better display the porous nature of the material. In such an electrode various mixtures of powder may be used. Where the electrode 1a is to be of compressed valve metal powders which are not sintered, I prefer an encasing tube 9 as in Fig. 4. This latter tube may be ventilated, slotted, or perforated, or of sintered porous material. A section of the tube 9 as shown at 9ª is preferably spun or pressed over to properly clinch the porous slug.

For the non-sintered electrodes of my invention, I preferably use a mixture of two or more powders and each may be of different grain size. Where a powder, for example aluminum, and another like tantalum, having different hardness characteristics, are used, I obtain an effective and permanent electrically conductive bond between grains, which is greatly desired. This bond is generally better in the presence of an electrolyte than the bond obtained with only one metal powder. This may result from the contact difference of potential effect between grains, or the electro-chemical effect therebetween which prevents film formation between contact points of the powders.

In Fig. 5 the cathode or lead-in electrodes 10 and 11 project into close proximity to the shell 9 of the anode slug 1ª. This shell is disclosed as sealed into glass or the like end pieces 12 and 13 which hold the electrode lead-ins 14 and 15 for the electrodes 10 and 11, respectively. In this manner, a low series resistance section is added to the condenser between these cathode electrodes and the anode shell, and this section is electrically parallel to the effective resistance path to the slug proper. In this form of condenser a contact or connection may be applied to the anode through shell 9, thus permitting a wide variety of external circuit connections to be made to the condenser. The shell 9 may be of tantalum which seals to glass, and the slug or electrode 1ª may be of aluminum or other valve metal powders.

In addition to forming my electrodes of mixtures of powders, the invention comprehends forming the electrode structure of relatively hard basic powders, such as tantalum, which has been suitably encased in a thin shell of a softer material, such as, for example, aluminum, by various well known processes of encasement, such as ball milling, sputtering or the like. This makes it possible to obtain better contact between metal particles where sintering is not resorted to for holding the particles together, as the soft outside metal will bond more readily than a hard powder.

Having thus described my invention, I claim:

1. In an electrolytic condenser having a container, an electrolyte in said container and non-film forming input electrodes sealed therein, a porous electrode therefor of valve metals sealed in said container, said porous electrode being mounted intermediate the input electrodes so as to effectively block high current flow directly between said input electrodes but permit a charge to accumulate upon said porous electrode.

2. In an electrolytic condenser having a container, an electrolyte and non-film forming input electrodes, a porous electrode of valve metal particles sealed in said container intermediate the input electrodes so as to effectively block high current flow directly between said input electrodes but permit a charge to accumulate upon said porous electrode, said porous electrode being of pressed powders of valve metals having different degrees in hardness to thereby provide a better and more lasting electrical contact between said metal particles.

3. In an electrolytic condenser having a container, an electrolyte and non-film forming input electrodes, a porous electrode of valve metal particles sealed in said container intermediate the input electrodes so as to effectively block high current flow directly between said input electrodes but permit a charge to accumulate upon said porous electrode, said porous electrode being of pressed powders of valve metals having different degrees in hardness to thereby provide a better and more lasting electrical contact between said metal particles, and a valve metal shell for encasing and retaining said particles in intimate contact with each other.

4. In an electrolytic condenser having a container, an electrolyte and spaced non-film forming input electrodes sealed in the container, a porous electrode of valve metal particles sealed in said container and positioned intermediate the input electrodes for effectively blocking high current flow directly between said input electrodes but permitting a charge to accumulate upon the porous electrode, said porous electrode being of pressed powders of valve metals having a difference in hardness factor whereby a better and more lasting electrical contact is had between the metal particles, and a valve metal shell for retaining the metal particles in intimate contact with each other, said input electrodes extending into close proximity to the porous electrode shell to thereby lower the series resistance and power factor of the condenser sections.

5. An electrolytic condenser consisting in an elongated container, an electrolyte in said container, a non-film forming electrode sealed in said container towards each end thereof, and an electrode consisting of an integral porous mass of non-sintered valve metal particles pre-formed to the desired voltage disposed transversely within said container intermediate said non-film forming electrodes whereby to effectively block high current flow directly between said input electrodes but permit a charge to accumulate upon said porous electrode.

RICHARD U. CLARK.